United States Patent
Chen et al.

(10) Patent No.: US 10,299,313 B2
(45) Date of Patent: May 21, 2019

(54) DOCSIS TO SUPPORT COORDINATED MULTI-POINT IN 5G SMALL CELLS

(71) Applicant: Futurewei Technologies, Inc., Plano, TX (US)

(72) Inventors: James Jeng Chen, Corona, CA (US); Li Zhang, Santa Clara, CA (US)

(73) Assignee: Futurewei Technologies, Inc., Plano, TX (US)

( * ) Notice: Subject to any disclaimer, the term of this patent is extended or adjusted under 35 U.S.C. 154(b) by 7 days.

(21) Appl. No.: 15/786,308

(22) Filed: Oct. 17, 2017

(65) Prior Publication Data

US 2018/0116009 A1    Apr. 26, 2018

Related U.S. Application Data

(60) Provisional application No. 62/410,982, filed on Oct. 21, 2016.

(51) Int. Cl.
   *H04W 72/00* (2009.01)
   *H04W 84/04* (2009.01)
   (Continued)

(52) U.S. Cl.
   CPC ......... *H04W 84/04* (2013.01); *H04L 5/0007* (2013.01); *H04L 5/0035* (2013.01);
   (Continued)

(58) Field of Classification Search
   CPC ..... H04W 16/10; H04W 24/00; H04W 28/04; H04W 72/04; H04W 72/082;
   (Continued)

(56) References Cited

U.S. PATENT DOCUMENTS

2008/0193137 A1* 8/2008 Thompson .......... H04L 12/2801
                                                          398/115
2014/0146758 A1* 5/2014 Lovell .................. H04L 5/0046
                                                          370/329
(Continued)

FOREIGN PATENT DOCUMENTS

| CN | 102158992 | 8/2011 |
|---|---|---|
| WO | WO-2014098978 | 6/2014 |
| WO | WO-2015094071 | 6/2015 |

OTHER PUBLICATIONS

"International Application No. PCT/CN2017/106899, International Search Report and Written Opinion dated Jan. 18, 2018", (Jan. 18, 2018), 11 pgs.
(Continued)

*Primary Examiner* — Justin Y Lee
*Assistant Examiner* — B M M Hannan
(74) *Attorney, Agent, or Firm* — Schwegman Lundberg & Woessner, P.A.

(57) ABSTRACT

A cable modem is provided that comprises: a base station interface; a cable network interface that connects the cable modem to a cable modem termination system and one or more other cable modems, the cable network interface communicating using orthogonal frequency-division multiple access (OFDMA); a memory storage comprising instructions; and one or more processors in communication with the cable network interface, the base station interface, and the memory storage. The one or more processors execute the instructions to: receive, via the base station interface, coordination data addressed to a first cable modem of the one or more other cable modems; receive, from the cable modem termination system via the cable network interface, an allocation of a resource block in an OFDMA symbol; and transmit, to the first cable modem via the cable
(Continued)

network interface, in the allocated resource block in the OFDMA symbol, the coordination data.

20 Claims, 11 Drawing Sheets

(51) Int. Cl.
    *H04L 5/00*         (2006.01)
    *H04W 88/02*     (2009.01)
    *H04W 88/14*     (2009.01)
    *H04W 92/04*     (2009.01)

(52) U.S. Cl.
    CPC ........... *H04L 5/0092* (2013.01); *H04W 88/02* (2013.01); *H04W 88/14* (2013.01); *H04W 92/045* (2013.01)

(58) Field of Classification Search
    CPC ..... H04W 84/04; H04W 88/02; H04W 88/14; H04W 92/20; H04L 5/0007
    See application file for complete search history.

(56) References Cited

U.S. PATENT DOCUMENTS

| | | | |
|---|---|---|---|
| 2014/0241377 A1* | 8/2014 | Pantelias | H04L 12/403 370/449 |
| 2017/0265216 A1* | 9/2017 | Andreoli-Fang | H04L 12/2801 |
| 2017/0265220 A1* | 9/2017 | Andreoli-Fang | H04W 72/14 |

OTHER PUBLICATIONS

Lee, Daewon, et al., "Coordinated Multiport Transmission and Reception in LTE-Advanced:Deployment Scenarios and Operational Challenges", *IEEE Communications Magazine*, (Feb. 2012), 148-155.

Nardini, Giovanni, et al., "Modelling X2 backhauling for LTE-Advanced and assessing its effect on CoMP Coordinated Scheduling", *2016 1st International Workshop on Link- and System Level Simulations (IWSLS)*, (2016), 8 pgs.

* cited by examiner

DOCSIS TO SUPPORT COORDINATED MULTI-POINT IN 5G SMALL CELLS

PRIORITY CLAIM

This application claims the benefit of priority to U.S. Provisional Patent Application Ser. No. 62/410,982, filed Oct. 21, 2016, and entitled "DOCSIS TO SUPPORT COORDINATED MULTI-POINT IN 5G SMALL CELLS," which provisional application is incorporated herein by reference in its entirety.

TECHNICAL FIELD

The present disclosure is related to systems and methods of integrating cable communication with cell communication, and in particular to using the Data Over Cable Service Interface Specification (DOCSIS) to support coordinated multi-point (COMP) communications in fifth-generation (5G) cellular networks.

BACKGROUND

Cable communication systems typically use a cable modem termination system (CMTS) in communication with a plurality of cable modems. The CMTS forms the interface to an Internet protocol (IP)-based network over the Internet. The CMTS modulates the data from the Internet for transmission to cable modems (e.g., homes, mobile devices, and offices) and receives the upstream data from the cable modems. The CMTS also manages load balancing and error correction. In these existing systems, for data to be transmitted from one cable modem to another, the data is first transmitted from one cable modem to the CMTS, and then from the CMTS to the second cable modem.

DOCSIS 3.1 uses orthogonal frequency-division multiplexing (OFDM) for data transmission. OFDM is a complex modulation method that uses a number of narrowband subcarriers (up to 8,192). All subcarriers are transmitted simultaneously. The set of simultaneously-transmitted subcarriers is called an OFDM symbol. Between OFDM symbols, a guard interval or cyclic prefix is used to prevent inter-signal interference during transmission and therefore prevents a loss of data.

Compared to fourth-generation (4G) cellular networks, 5G networks use smaller cells with higher bandwidth and lower latency. Accordingly, methods that communicate data between cells of a 4G network may be unable to handle the larger number of cells of a 5G network, especially while attempting to meet the higher bandwidth and lower latency requirements of 5G. Additionally, since the 5G cells are smaller, the percentage of mobile connections that will be near the edge of a cell or in overlapping cells is higher when compared to 4G.

SUMMARY

Various examples are now described to introduce a selection of concepts in a simplified form that are further described below in the detailed description. The Summary is not intended to identify key or essential features of the claimed subject matter, nor is it intended to be used to limit the scope of the claimed subject matter.

According to one aspect of the present disclosure, a cable modem is provided that comprises: a base station interface; a cable network interface that connects the cable modem to a cable modem termination system and one or more other cable modems, the cable network interface communicating using orthogonal frequency-division multiple access (OFDMA); a memory storage comprising instructions; and one or more processors in communication with the cable network interface, the base station interface, and the memory storage, wherein the one or more processors execute the instructions to: receive, via the base station interface, coordination data addressed to a first cable modem of the one or more other cable modems; receive, from the cable modem termination system via the cable network interface, an allocation of a resource block in an OFDMA symbol; and transmit, to the first cable modem via the cable network interface, in the allocated resource block in the OFDMA symbol, the coordination data.

Optionally, in any of the preceding aspects, the one or more processors further execute the instructions to: after receiving the coordination data via the base station interface, request, from the cable modem termination system via the cable network interface, the allocation of the resource block in the OFDMA symbol.

Optionally, in any of the preceding aspects, the coordination data is addressed to a plurality of cable modems of the one or more other cable modems, including the first cable modem; and the transmitting of the coordination data comprises transmitting the coordination data to the plurality of cable modems.

Optionally, in any of the preceding aspects, the coordination data allows a base station in communication with the base station interface and a base station associated with the first cable modem to operate as a base station array for a mobile device.

Optionally, in any of the preceding aspects, the one or more processors further execute the instructions to: receive data traffic from the cable modem termination system via the cable network interface, the data traffic being received prior to the transmitting of the coordination data, the data traffic being addressed to the mobile device.

Optionally, in any of the preceding aspects, the base station interface is an interface to a 5G base station.

Optionally, in any of the preceding aspects, the one or more processors further execute the instructions to: receive, from the first cable modem via the cable network interface, coordination data for a first base station corresponding to the first cable modem; and transmit, via the base station interface, the coordination data for the first base station.

According to one aspect of the present disclosure, a computer-implemented method for transmitting data from a cable modem to one or more other cable modems is provided that comprises: receiving, by one or more processors of the cable modem via a base station interface of the cable modem, coordination data addressed to a first cable modem of the one or more other cable modems; receiving, by the one or more processors, from a cable modem termination system via a cable network interface of the cable modem using orthogonal frequency-division multiple access (OFDMA), an allocation of a resource block in an OFDMA symbol; and transmitting to the first cable modem, by the one or more processors, via the cable network interface, in the allocated resource block in the OFDMA symbol, the coordination data.

Optionally, in any of the preceding aspects, after receiving the coordination data via the base station interface, requesting from the cable modem termination system via the cable network interface, by the one or more processors, the allocation of the resource block in the OFDMA symbol.

Optionally, in any of the preceding aspects, the coordination data is addressed to a plurality of cable modems of the one or more other cable modems, including the first cable modem; and the transmitting of the coordination data comprises transmitting the coordination data to the plurality of cable modems.

Optionally, in any of the preceding aspects, the coordination data allows a base station in communication with the base station interface and a base station associated with the first cable modem to operate as a base station array for a mobile device.

Optionally, in any of the preceding aspects, the method further comprises: receiving data traffic from the cable modem termination system via the cable network interface, the data traffic being received prior to the transmitting of the coordination data, the data traffic being addressed to the mobile device.

Optionally, in any of the preceding aspects, the receiving of the coordination data via the base station interface comprises receiving the coordination data via an interface to a 5G base station.

Optionally, in any of the preceding aspects, the method further comprises: receiving, from the first cable modem via the cable network interface, coordination data for a first base station corresponding to the first cable modem; and transmitting, via the base station interface, the coordination data for the first base station.

According to one aspect of the present disclosure, a non-transitory computer-readable medium is provided that stores computer instructions for transmitting data from a cable modem to one or more other cable modems, that when executed by one or more processors of the cable modem, cause the one or more processors to perform the steps of: receiving, via a base station interface of the cable modem, coordination data addressed to a first cable modem of the one or more other cable modems; receiving, from a cable modem termination system via a cable network interface of the cable modem using orthogonal frequency-division multiple access (OFDMA), an allocation of a resource block in an OFDMA symbol; and transmitting, to the first cable modem, via the cable network interface, in the allocated resource block in the OFDMA symbol, the coordination data.

Optionally, in any of the preceding aspects, the steps further comprise: after receiving the coordination data via the base station interface, requesting, from the cable modem termination system and via the cable network interface, the allocation of the resource block in the OFDMA symbol.

Optionally, in any of the preceding aspects, the coordination data is addressed to a plurality of cable modems of the one or more other cable modems, including the first cable modem; and the transmitting of the coordination data comprises transmitting the coordination data to the plurality of cable modems.

Optionally, in any of the preceding aspects, the coordination data allows a base station communicating with the base station interface and a base station associated with the first cable modem to operate as a base station array for a mobile device.

Optionally, in any of the preceding aspects, the steps further comprise: receiving data traffic from the cable modem termination system via the cable network interface, the data traffic being received prior to the transmitting of the coordination data, the data traffic being addressed to the mobile device.

Optionally, in any of the preceding aspects, wherein the receiving of the coordination data via the base station interface comprises receiving the coordination data via an interface to a 5G base station.

Any one of the foregoing examples may be combined with any one or more of the other foregoing examples to create a new embodiment within the scope of the present disclosure.

DETAILED DESCRIPTION

In the following description, reference is made to the accompanying drawings that form a part hereof, and in which is shown by way of illustration specific embodiments which may be practiced. These embodiments are described in sufficient detail to enable those skilled in the art to practice the invention, and it is to be understood that other embodiments may be utilized and that structural, logical and electrical changes may be made without departing from the scope of the present invention. The following description of example embodiments is, therefore, not to be taken in a limited sense, and the scope of the present invention is defined by the appended claims.

The functions or algorithms described herein may be implemented in software in one embodiment. The software may consist of computer-executable instructions stored on computer-readable media or computer-readable storage device such as one or more non-transitory memories or other type of hardware-based storage devices, either local or networked. Further, such functions correspond to modules, which may be software, hardware, firmware or any combination thereof. Multiple functions may be performed in one or more modules as desired, and the embodiments described are merely examples. The software may be executed on a digital signal processor, ASIC, microprocessor, or other type of processor operating on a computer system, such as a personal computer, server or other computer system, turning such computer system into a specifically programmed machine.

Systems and methods are disclosed herein that allow data to be transmitted directly from one cable modem on a cable network to another cable modem on the cable network, without requiring the data transfer to be received and transmitted by a CMTS. In some example embodiments, the CMTS allocates a set of subcarriers (also referred to as a resource block) in an orthogonal frequency-division multiple access (OFDMA) symbol for use in the direct communication. The data transmitted may include coordination data. Coordination data is data that, when provided to one or more base stations of a plurality of base stations, allows the plurality of base stations to be coordinated as a base station array for communication with a mobile device. The coordination data provided to each of the base stations that form the array may be different. For example, the position of the mobile device and the other base stations may be provided to each base station when each base station already stores its own position. One example of coordination data is data that supports enhanced inter-cell interference coordination (eICIC).

Figure 1:
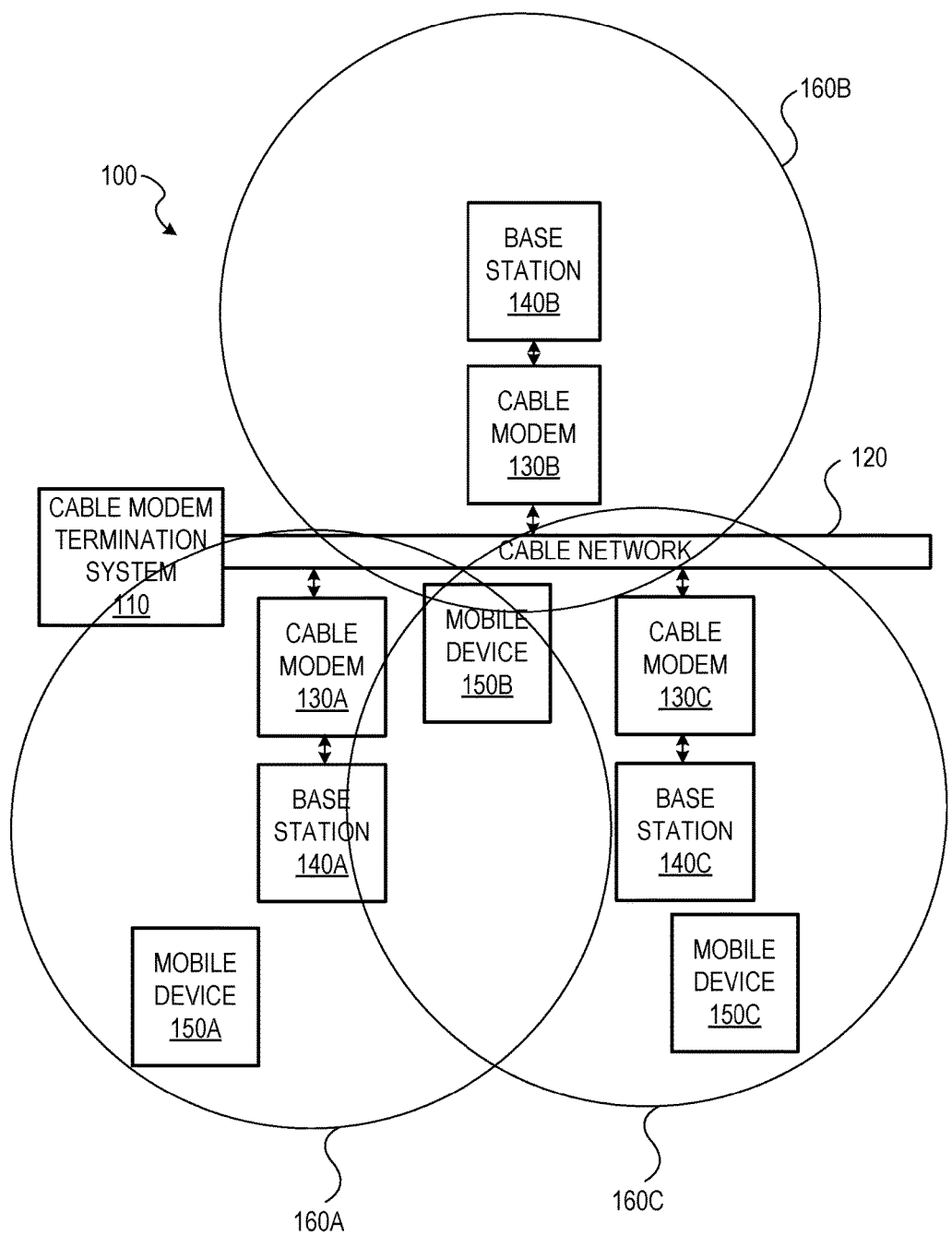
FIG. 1 is a block diagram illustrating a cable backbone for a cellular network according to some example embodiments.

FIG. 1 is a block diagram 100 illustrating a cable backbone for a cellular network according to some example embodiments. Shown in FIG. 1 are a CMTS 110, a cable network 120, cable modems 130A-130C, referred to collectively as cable modems 130 or individually as a cable modem 130, base stations 140A-140C, referred to collectively as base stations 140 or individually as a base station 140, mobile devices 150A-150C, referred to collectively as mobile devices 150 or individually as a mobile device 150, and areas of cellular coverage 160A-160C, referred to collectively as areas of cellular coverage 160 or individually as an area of cellular coverage 160.

The base stations 140A-140C and their corresponding areas of cellular coverage 160A-160C provide cellular service to the mobile devices 150A-150C within their area of cellular coverage. For example, the mobile device 150A is within the area of cellular coverage 160A and communicates exclusively with the base station 140A. The mobile device 150C is within the area of cellular coverage 160C and communicates exclusively with the base station 140C. However, the mobile device 150B, which is partially within the areas of coverage of all three of the base stations 140A-140C, may communicate with any or all of the three base stations.

In the example embodiment of FIG. 1, the base stations 140 do not communicate wirelessly, and instead communicate via the cable network 120. The cable modems 130A-130C send and receive data via the cable network 120, under the direction of the CMTS 110. Thus, the mobile device 150C in the area of cellular coverage 160C of the base station 140C can send data to the mobile device 150A in the area of cellular coverage 160A of the base station 140A by 1) transmitting data to the base station 140C, which 2) provides the data to the cable modem 130C, which 3) communicates the data via the cable network 120 to the cable modem 130A, which 4) provides the data to the base station 140A, which 5) transmits the data to the mobile device 150A. Types of data transmitted can include audio (e.g., music or voice), video, documents, applications, or any suitable combination thereof.

Figure 2:
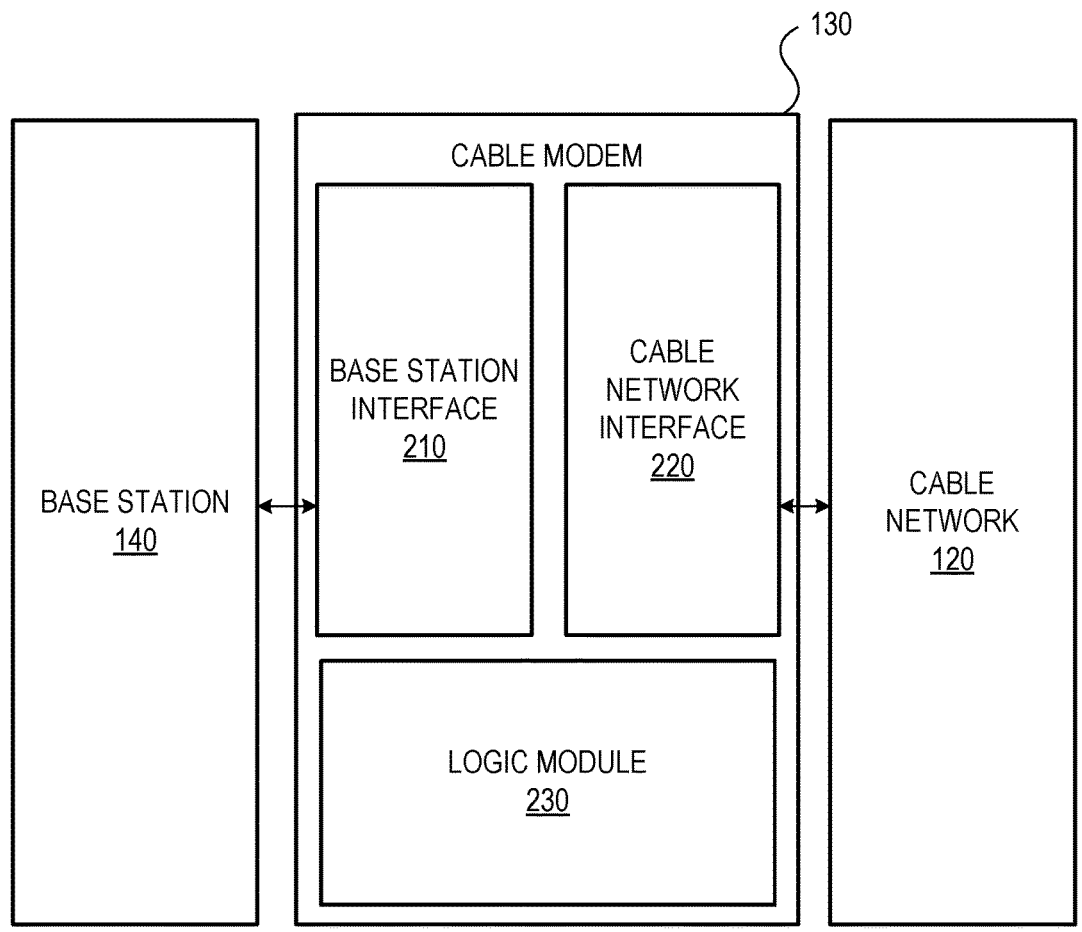
FIG. 2 is a block diagram illustrating a cable modem in communication with a cellular network and a cable network, according to some example embodiments.

FIG. 2 is a block diagram illustrating a cable modem 130 in communication with a base station 140 and a cable network 120, according to some example embodiments. The cable modem 130 includes a base station interface 210, a cable network interface 220, and a logic module 230 in electronic communication (e.g., via a high-speed bus).

The base station interface 210 communicates with the base station 140 (e.g., via Ethernet). For example, the base station interface 210 may transmit information to the base station 140 that is destined for a mobile device 150 within the area of cellular coverage 160 for the base station 140. As another example, the base station interface 210 may receive information from the base station 140 that originated from a mobile device 150 within the area of cellular coverage 160 for the base station 140 and is destined for another mobile device 150 outside of the area of cellular coverage 160 for the base station 140. In some example embodiments, the base station interface 210 communicates with multiple base stations. Accordingly, while the relationship between base stations and cable modems is generally described as being a one-to-one correspondence herein, embodiments in which one cable modem transmits and receives coordination data with multiple base stations are also contemplated.

The cable network interface 220 communicates with the cable network 120 (e.g., via DOCSIS 3.1). For example, the base station 140 may transmit information to or receive information from the CMTS 110 via the cable network 120, may transmit information to or receive information from another cable modem 130 via the cable network 120, or both. The information sent and received may include cellular traffic, control traffic, or both.

The logic module 230 controls the use of the base station interface 210 and the cable network interface 220. The logic module 230 may include a processing unit and memory and may execute, among other things, the method 900 described with respect to FIG. 9, below.

Figure 3:
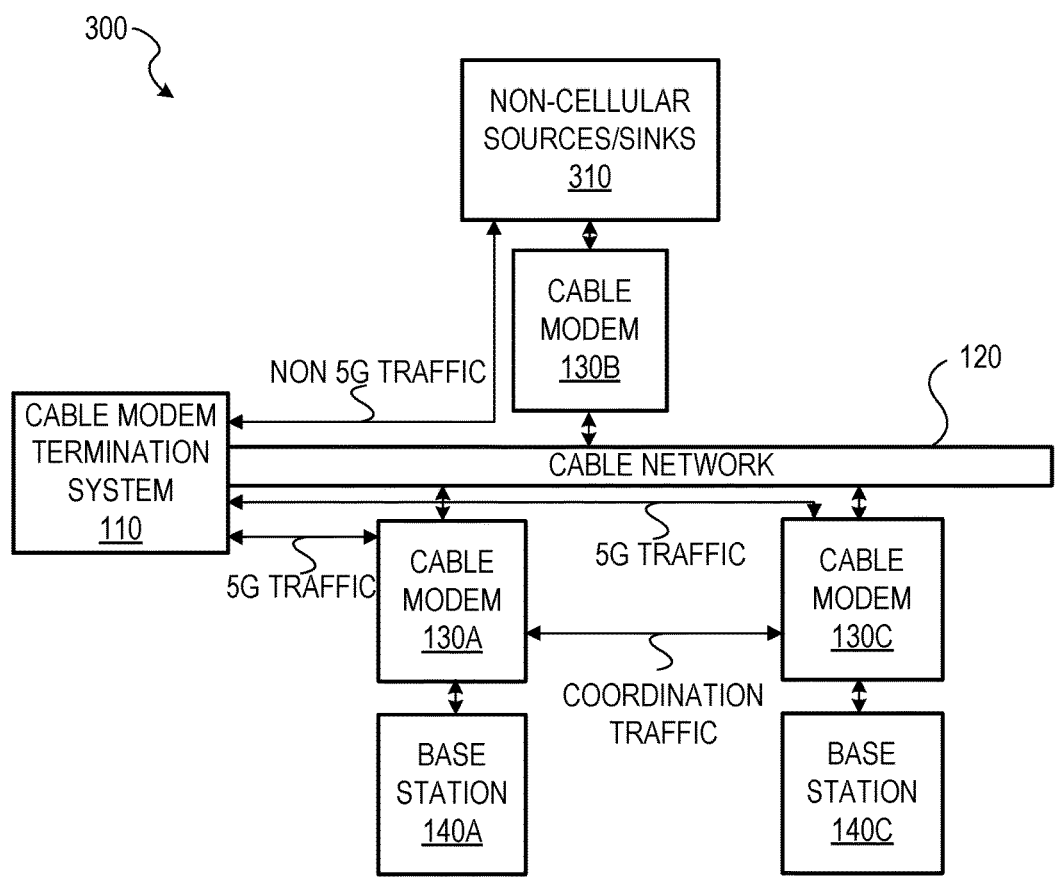
FIG. 3 is a block diagram illustrating communications between cable modems and a CMTS in a cable network, according to some example embodiments.

FIG. 3 is a block diagram 300 illustrating communications between cable modems 130 and a CMTS 110 in a cable network 120, according to some example embodiments. The block diagram 300 includes the CMTS 110 communicating via the cable network 120 with the cable modems 130A-130C. Cable modem 130B is in communication with non-cellular sources/sinks 310. Cable modems 130A and 130C are in communication with base stations 140A and 140C, respectively.

The non-cellular sources/sinks 310 (e.g., cable television sets, non-cellular wireless routers, or both) send and receive non-5G traffic. The non-5G traffic is communicated between the cable modem 130B and the CMTS 110.

The cable modems 130A and 130C send and receive 5G traffic that is provided or consumed by the base stations 140A and 140C. The 5G traffic is communicated between each cable modem 130 and the CMTS 110. Additionally, coordination traffic is communicated directly between the cable modem 130A and the cable modem 130C. The coordination traffic includes information needed to implement COMP to allow the base stations 140A and 140C to operate as a larger array with respect to a particular mobile device. COMP increases throughput for edge users, improves coverage, and reduces the need for more base stations. However, COMP requires a guaranteed max-latency connection between coordinated base stations to ensure that coordination data can be exchanged without delaying communication with the mobile device. Additionally, to support COMP, the coordinated base stations must receive at least one data packet from the mobile device before coordination packets can be exchanged to form an array with the coordinated base stations.

As shown in the block diagram 300, the coordination traffic is not sent to or received from the CMTS 110. For comparison, note that to communicate along the paths labeled "5G traffic," data must first be sent by the originating cable modem 130 to the CMTS 110 and then sent from the CMTS 110 to the destination cable modem 130.

Figure 4:
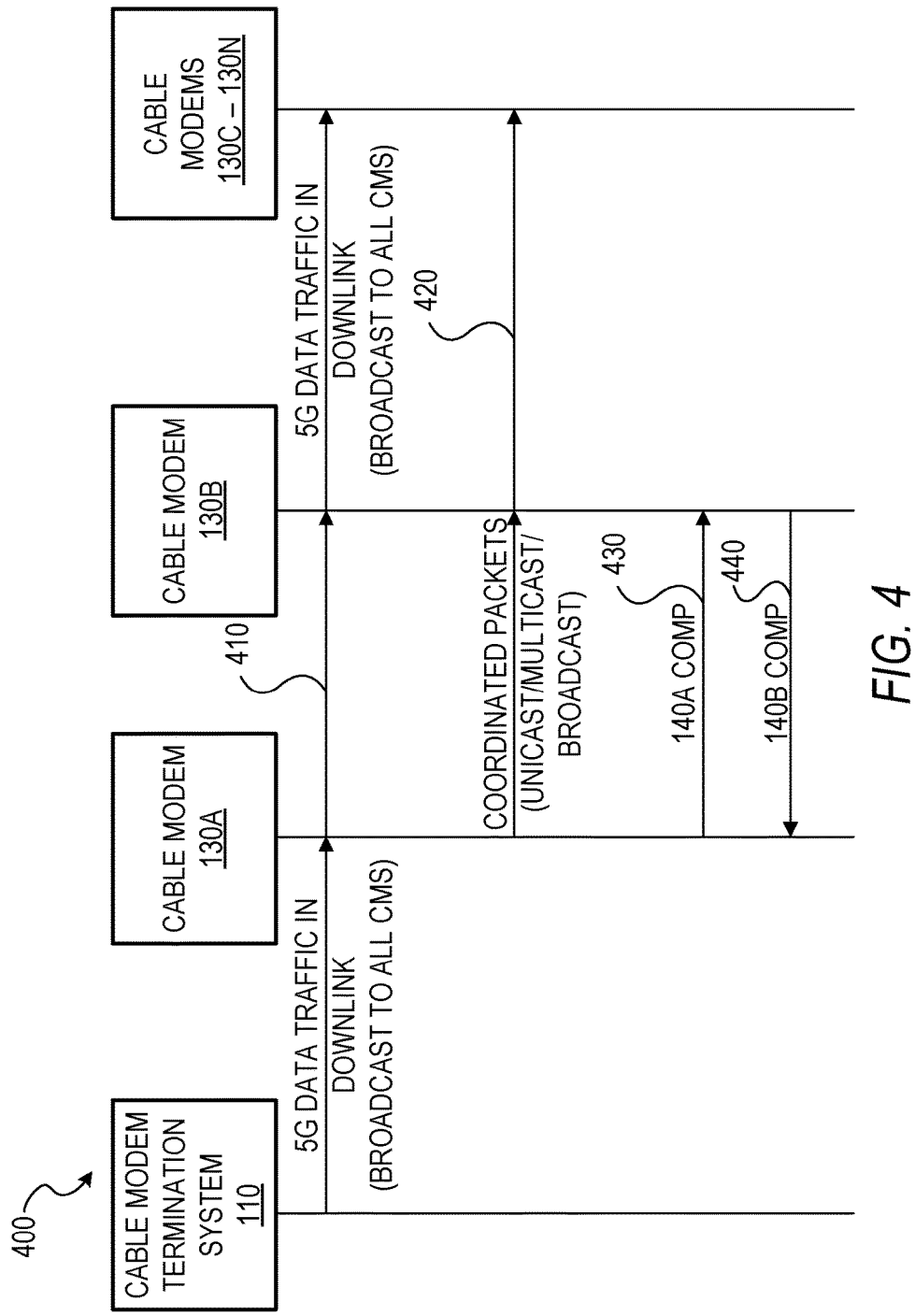
FIG. 4 is a block diagram illustrating communications between cable modems and a CMTS in a cable network, according to some example embodiments.

FIG. 4 is a block diagram 400 illustrating communications between cable modems 130 and the CMTS 110 in a cable network, according to some example embodiments. The block diagram 400 includes the communications 410-440.

The communication 410 is a broadcast of 5G data traffic from the CMTS 110 to cable modems 130A-130N. Each cable modem 130A-130N receives the data traffic and determines how to handle it. The data traffic is addressed to a mobile device.

The communication 420 is a communication of coordinated packets from the cable modem 130A to one or more of the cable modems 130B-130N. The coordinated packets can be unicast (i.e., transmitted with a single destination), multicast (i.e., transmitted with multiple destinations), or broadcast (transmitted for handling by all cable modems on the network).

Also shown are the COMP communications 430 and 440. The 140A COMP communication 430 contains coordination data for the base station 140A from the cable modem 130A to the cable modem 130B. The 140B COMP communication 440 contains coordination data for the base station 140B from the cable modem 130B to the cable modem 130A. To support COMP, the base stations have to exchange channel information after 5G data traffic is received by the base stations. An individual cable modem transmits coordinated packets to a specific cable modem or to a group of cable modems in an assigned minislot located in the OFDMA symbol selected by the CMTS. The one or more cable modems retrieve the content of the coordinated packets from the assigned minislot. A minislot is a group of dedicated subcarriers, all with the same modulation order, for upstream transmission by a particular cable modem. A cable modem may be assigned one or more minislots in a transmission burst by the scheduler of the CMTS. The scheduler of the CMTS may also be referred to as a COMP scheduler or a resource controller.

A 5G cable modem can request that data on the assigned minislot be transmitted using unicast, multicast, or broadcast communications to another 5G cable modem or a group of cable modems. In some example embodiments, the minislot for use in transmitting the COMP data is predetermined. For example, a unique location in the DOCSIS OFDM subcarrier or subcarriers can be read by 5G cable modems to retrieve CSI or small cell coordination data stored in the DOCSIS OFDM symbol or subcarriers.

While example embodiments are described using OFDM-based communication, use of the invention is contemplated with any form of modulation scheme. Thus, the signaling or coordination protocol or packets involved doesn't apply only to eICIC, and instead applies to any protocol or message exchange for coordination data communicated between remote cells. The timing clock from the CMTS to a cable modem may be synchronized using request (REQ) and response (RSP) messages so that a precision time for small cell coordination can be achieved.

The allocated spectrum for the direct communication between the cable modems 130A and 130B can be shared among multiple cable modems simultaneously in a full-duplex cable network. In systems using the existing full-duplex DOCSIS protocol, individual channels may be assigned to upstream or downstream use dynamically, but all traffic flows between the CMTS and the cable modems, not directly between cable modems. In some example embodiments, full-duplex DOCSIS is expanded to allocate a peer-to-peer or peer-to-multi-peer resource block for coordination data. For example, if the cable modem 130A requests allocation of a resource block to send coordination data to the cable modem 130B, the CMTS 110 allocates a resource block and assigns the cable modem 130A as the upstream transmitter and assigns the cable modem 130B as the downstream receiver. After the resource block is allocated, the cable modem 130A sends data directly to the cable modem 130B in the allocated resource block. Likewise, if the cable modem 130A requests to transmit data to multiple cable modems 130, all of the identified cable modems 130 can be designated as receivers by the CMTS 110 and can simultaneously access the data transmitted by the cable modem 130A.

In some example embodiments, one or more frequency bands are reserved for CMTS-to-modem communications and one or more frequency bands are reserved for modem-to-modem communications. For example, a frequency range of 200-299 MHz may be reserved for modem-to-modem communications in one direction (e.g., from the cable modem 130A to the cable modem 130B), a frequency range of 300-399 MHz may be reserved for modem-to-modem communications in a reverse direction (e.g., from the cable modem 130B to the cable modem 130A), a frequency range of 400-499 MHz may be reserved for CMTS-to-modem communications in one direction (e.g., from the cable modems 130 to the CMTS 110), and a frequency range of 500-599 MHz may be reserved for CMTS-to-modem communications in a reverse direction (e.g., from the CMTS 110 to the cable modems 130).

After the coordination data is exchanged between the cable modems 130A-130N, each cable modem provides the received coordination data to its corresponding base station (e.g., the base stations 130A-130C of FIG. 1). Using the coordination data, the base stations operate as a base station array and transmit the data traffic to the mobile device (e.g., the mobile device 150B of FIG. 1).

Figure 5:
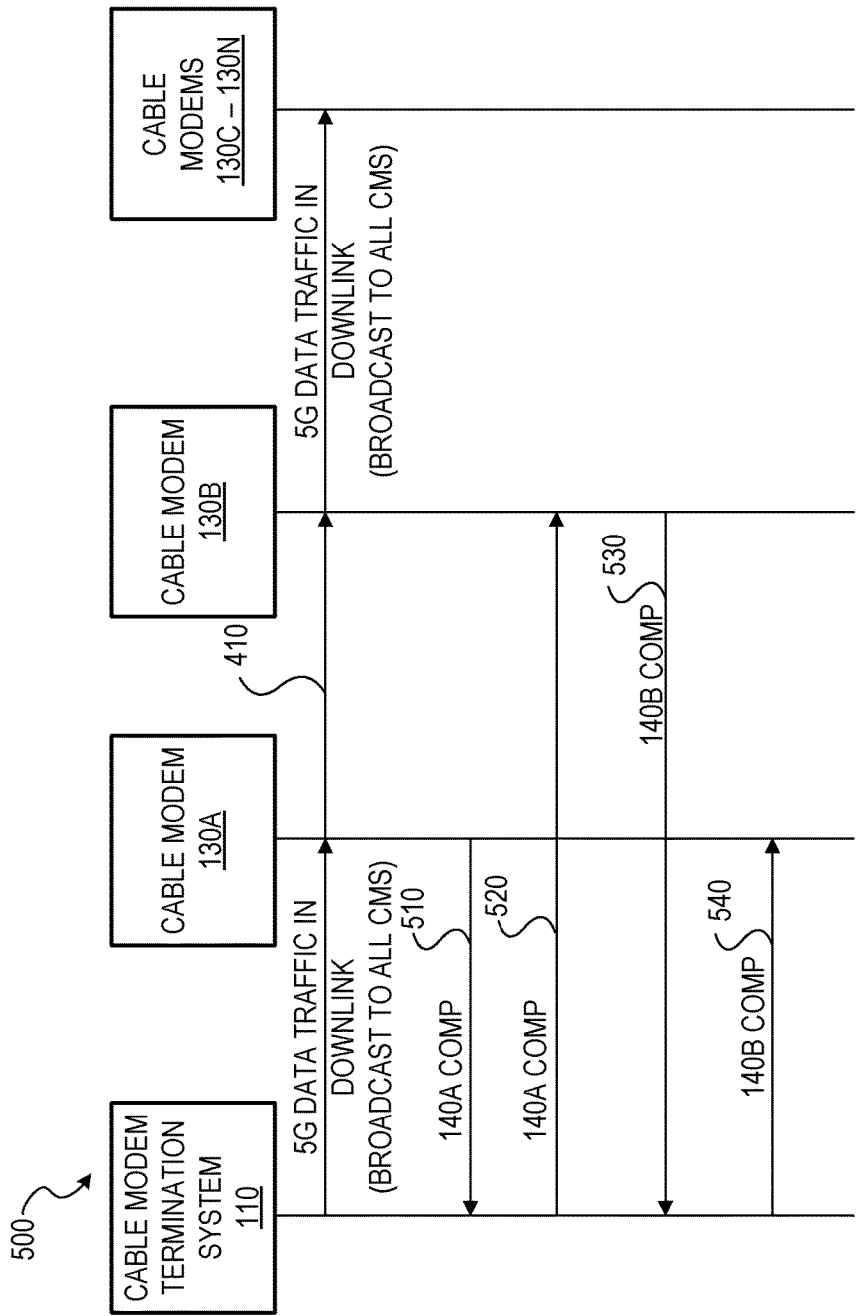
FIG. 5 is a block diagram illustrating communications between cable modems and a CMTS in a cable network, according to some example embodiments.

FIG. 5 is a block diagram 500 illustrating communications between cable modems 130 and the CMTS 110 in a cable network, according to some example embodiments. The block diagram 500 includes the communications 410, 510, 520, 530, and 540.

The communication 410 is a broadcast of 5G data traffic from the CMTS 110 to all cable modems 130A-130N. Each cable modem 130A-130N receives the data traffic and determines how to handle it.

The 140A COMP communications 510 and 520 contain coordination data for the base station 140A from the cable modem 130A to the cable modem 130B via the CMTS 110. The 140B COMP communications 530 and 540 contain coordination data for the base station 140B sent from the cable modem 130B to the cable modem 130A via the CMTS 110. By comparison to the COMP communications 430 and 440 of FIG. 4, the COMP communications of FIG. 5 will take at least twice as long to arrive at their destinations, by virtue of their being sent twice. Nonetheless, implementation of the communications of FIG. 5 allows for coordination traffic to be sent between base stations (e.g., 5G base stations), which allows for those base stations to operate as an array.

Figure 6:
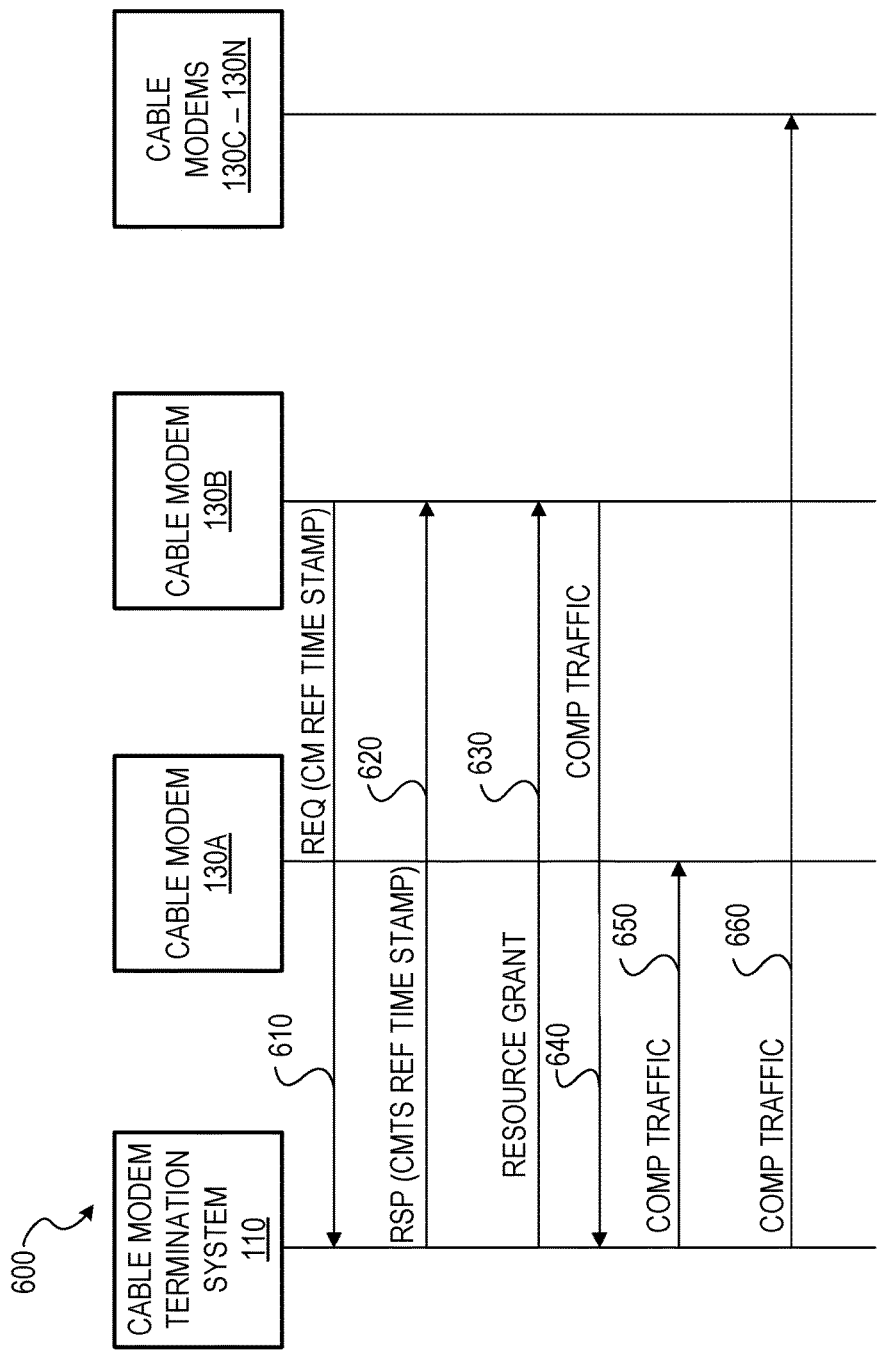
FIG. 6 is a block diagram illustrating communications between cable modems and a CMTS in a cable network, according to some example embodiments.

FIG. 6 is a block diagram 600 illustrating communications between cable modems 130 and the CMTS 110 in a cable network, according to some example embodiments. The block diagram 600 includes the communications 610, 620, 630, 640, 650, and 660.

The communication 610 is a request from the cable modem 130B to the CMTS 110. The communication 610 includes a reference time stamp from the cable modem 130B. Based on a difference between the reference time stamp received by the CMTS 110 and the time at the CMTS 110, a difference may be determined by the CMTS 110 that indicates the transmission time from the cable modem 130B to the CMTS 110, a difference between the clock of the cable modem 130B and the clock of the CMTS 110, or both.

The communication 620 is a response from the CMTS 110 to the cable modem 130B, sent in response to the communication 510. The communication 620 includes a reference time stamp from the CMTS 110. Based on a difference between the reference time stamp received by the cable modem 130B and the time at the cable modem 130B, a difference may be determined by the cable modem 130B that indicates the transmission time from the CMTS 110 to the cable modem 130B, a difference between the clock of the cable modem 130B and the clock of the CMTS 110, or both.

The communication 630 is a resource grant from the CMTS 110 to the cable modem 130B. The resource grant identifies one or more minislots for use by the cable modem 130B in transmitting coordination data.

The COMP traffic communications 640 and 650 contain coordination data for the base station 140B from the cable modem 130B to the cable modem 130A via the CMTS 110. The COMP traffic communication 640 uses the minislot indicated in the resource grant communication 630. The COMP traffic communication 660 contains the coordination for the base station 140B to the cable modems 130C-130N, also intermediated by the CMTS 110.

Figure 7:
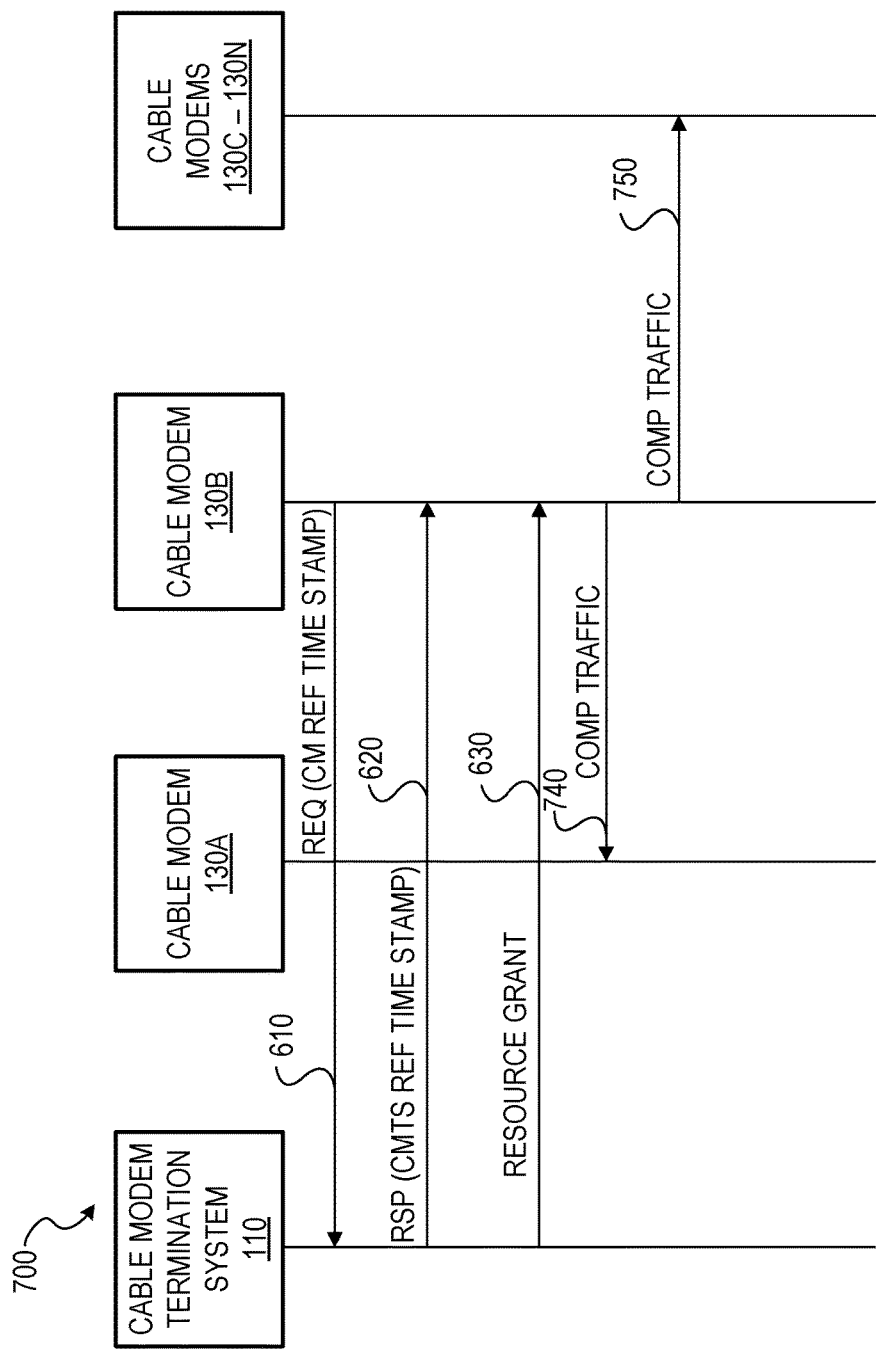
FIG. 7 is a block diagram illustrating communications between cable modems and a CMTS in a cable network, according to some example embodiments.

FIG. 7 is a block diagram 700 illustrating communications between cable modems 130 and the CMTS 110 in a cable network, according to some example embodiments. The block diagram 700 includes the communications 610, 620, 630, 740, and 750. The communications 610-630 are described above with respect to FIG. 6.

The communications 740 and 750 contain coordination data for the base station 140B from the cable modem 130B to the cable modem 130A (communication 740) and the cable modems 130C-130N (communication 750). By comparison, the COMP communications of FIG. 6 (communications 640-660) will take at least twice as long to arrive at their destinations, by virtue of their being sent twice.

Figure 8:
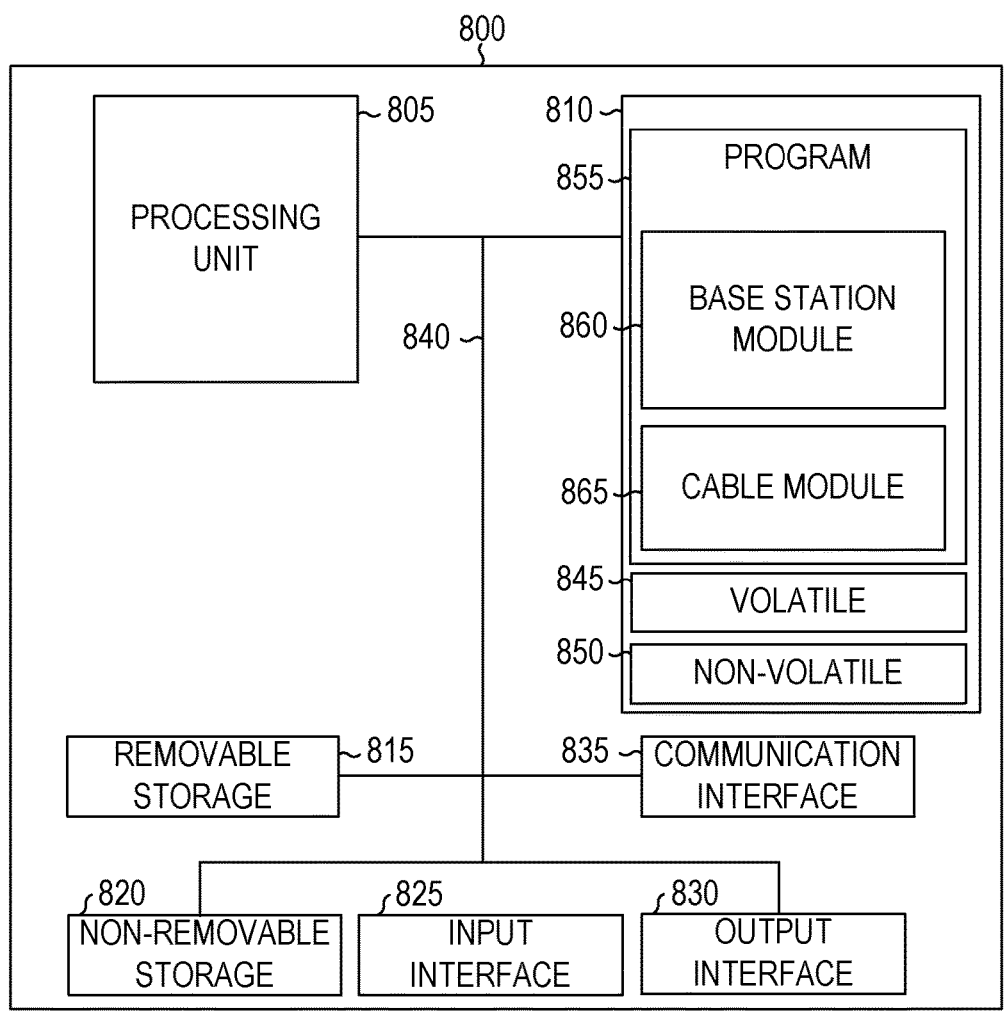
FIG. 8 is a block diagram illustrating circuitry for cable modems and CMTSes for implementing algorithms and performing methods according to example embodiments.

FIG. 8 is a block diagram illustrating circuitry for using DOCSIS to support COMP communications in 5G cellular networks performing methods according to example embodiments. All components need not be used in various embodiments. For example, the clients, servers, and network resources may each use a different set of components, or in the case of servers for example, larger storage devices.

One example computing device in the form of a computer 800 (also referred to as computing device 800 and computer system 800) may include a processor 805, memory storage 810, removable storage 815, and non-removable storage 820, all connected by a bus 840. Although the example computing device is illustrated and described as the computer 800, the computing device may be in different forms in different embodiments. For example, the computing device may instead be a smartphone, a tablet, a smartwatch, or another computing device including elements the same as or similar to those illustrated and described with regard to FIG. 8. Devices such as smartphones, tablets, and smartwatches are generally collectively referred to as "mobile devices" or "user equipment." Further, although the various data storage elements are illustrated as part of the computer 800, the storage may also or alternatively include cloud-based storage accessible via a network, such as the Internet, or server-based storage.

The memory storage 810 may include volatile memory 845 and non-volatile memory 850, and may store a program 855. The computer 800 may include, or have access to a computing environment that includes, a variety of computer-readable media, such as the volatile memory 845, the non-volatile memory 850, the removable storage 815, and the non-removable storage 820. Computer storage includes random-access memory (RAM), read-only memory (ROM), erasable programmable read-only memory (EPROM) and electrically erasable programmable read-only memory (EEPROM), flash memory or other memory technologies, compact disc read-only memory (CD ROM), digital versatile disks (DVD) or other optical disk storage, magnetic cassettes, magnetic tape, magnetic disk storage or other magnetic storage devices, or any other medium capable of storing computer-readable instructions.

The computer 800 may include or have access to a computing environment that includes an input interface 825, an output interface 830, and a communication interface 835. The output interface 820 may interface to or include a display device, such as a touchscreen, that also may serve as an input device. The input interface 825 may interface to or include one or more of a touchscreen, a touchpad, a mouse, a keyboard, a camera, one or more device-specific buttons, one or more sensors integrated within or coupled via wired or wireless data connections to the computer 800, and other input devices. The computer 800 may operate in a networked environment using the communication interface 835 to connect to one or more remote computers, such as database servers. The remote computer may include a personal computer (PC), server, router, network PC, peer device or other common network node, or the like. The communication interface 835 may connect to a local-area network (LAN), a wide-area network (WAN), a cellular network, a WiFi network, a Bluetooth network, or other networks.

Computer instructions stored on a computer-readable medium (e.g., the program 855 stored in the memory storage 810) are executable by the processor 805 of the computer 800. A hard drive, CD-ROM, and RAM are some examples of articles including a non-transitory computer-readable medium such as a storage device. The terms "computer-readable medium" and "storage device" do not include carrier waves to the extent that carrier waves are deemed too transitory. "Computer-readable non-transitory media" includes all types of computer-readable media, including magnetic storage media, optical storage media, flash media, and solid-state storage media. It should be understood that software can be installed in and sold with a computer. Alternatively, the software can be obtained and loaded into the computer, including obtaining the software through a physical medium or distribution system, including, for example, from a server owned by the software creator or from a server not owned but used by the software creator. The software can be stored on a server for distribution over the Internet, for example.

The program 855 is shown as including a base station module 860 and a cable module 865. Any one or more of the modules described herein may be implemented using hardware (e.g., a processor of a machine, an ASIC, an FPGA, or any suitable combination thereof). Moreover, any two or more of these modules may be combined into a single module, and the functions described herein for a single module may be subdivided among multiple modules. Furthermore, according to various example embodiments, modules described herein as being implemented within a single machine, database, or device may be distributed across multiple machines, databases, or devices.

The base station module 860 of the cable modem 130 receives data from the base station 140 and transmits data to the base station 140 using the base station interface 210 (e.g., implemented using an input interface 825 and an output interface 830). The base station module 860 of the base station 140 receives coordination data from the cable modem, enabling the base station 140 to form an array with other base stations.

The cable module 865 of the cable modem 130 receives data from the cable network 120 (e.g., from the CMTS 110 or another cable modem) and transmits data using the cable network 120. Communications of the cable module 865 may be performed using the cable modem interface 220 (e.g., implemented using an input interface 825 and an output interface 830).

In some embodiments, the base station module 860 receives, via a base station interface, coordination data addressed to a first cable modem of the one or more other cable modems. The cable module 865 may receive, from a cable modem termination system via a cable network interface using OFDMA, an allocation of a resource block in an OFDMA symbol. The cable module 865 may transmit, to the first cable modem via the cable network interface, in the allocated resource block in the OFDMA symbol, the coordination data.

Figure 9:
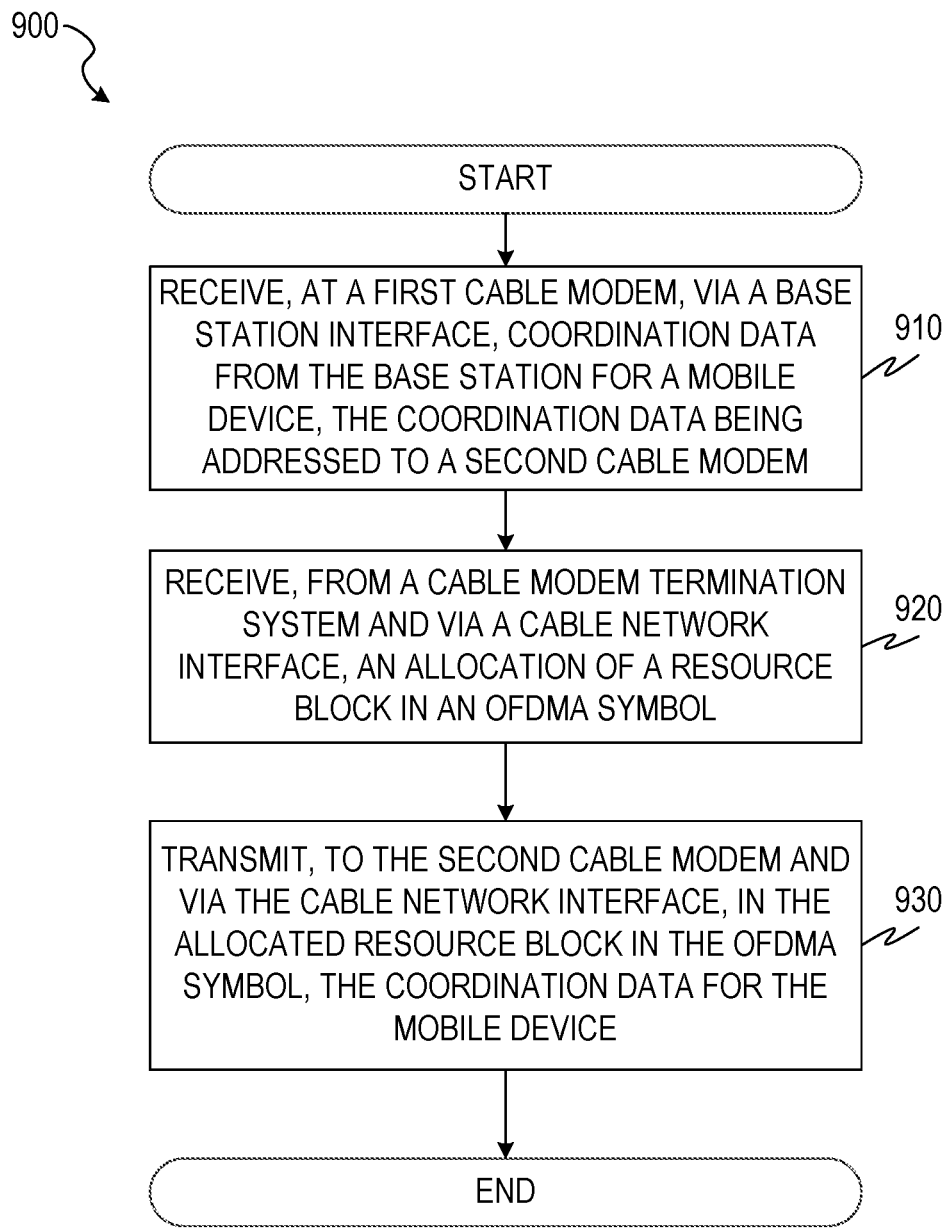
FIG. 9 is a flowchart illustrating operations of a cable modem in communicating via a cellular network and a cable network, according to some example embodiments.

FIG. 9 is a flowchart illustrating operations of a cable modem in a process 900 of communicating via a cellular network and a cable network, according to some example embodiments. The process 900 includes the operations 910, 920, and 930. For purposes of illustration and not limitation, the operations 910-930 are described as being performed by the cable modem 130 and its components, as shown in FIGS. 1-8.

In operation 910, a cable module 865 of a first cable modem 130A receives, via a base station interface 210, coordination data from a base station 140A. The coordination data is for a particular mobile device (e.g., a mobile device 150) that the base station 140A is in communication with, and is based on a location of the mobile device relative to the base station 140A and one or more other base stations. The coordination data is addressed to the one or more other base stations (e.g., to a second base station), to the one or more other cable modems associated with the one or more other base stations (e.g., to a second cable modem), or any suitable combination thereof. In some example embodiments, the coordination data is addressed to the base station 140A in addition to the one or more other base stations. In other example embodiments, the coordination data is addressed to the first cable modem in addition to the one or more other cable modems.

In operation 920, the cable module 865 of the cable modem 130A receives, from the CMTS 110 via the cable network interface 220, an allocation of a resource block in an OFDMA symbol. The resource block may have been allocated in response to a request from the cable modem 130A. In some example embodiments, the resource block is allocated automatically by the CMTS 110. For example, the cable modem 130A may be allocated a resource block in every OFDMA symbol or periodically (e.g., in every second symbol, every third symbol, or any other interval).

In operation 930, the cable module 865 of the cable modem 130A, transmits, to the one or more other cable modems via the cable network interface 220, the coordination data. The coordination data is sent in the allocated resource block in the OFDMA symbol. The coordination data received by the one or more other cable modems is provided by each of those cable modems to its associated base station.

In some example embodiments, the process 900 is performed by each of the cable modems 130 in communication with base stations 140 that are in communication with the particular mobile device. Once coordination data has been exchanged between all of the base stations 140 communicating with the particular mobile device, the coordination data can be used by each base station 140 to form a coordinated array, which will improve the communication strength with the particular mobile device.

Figure 10:
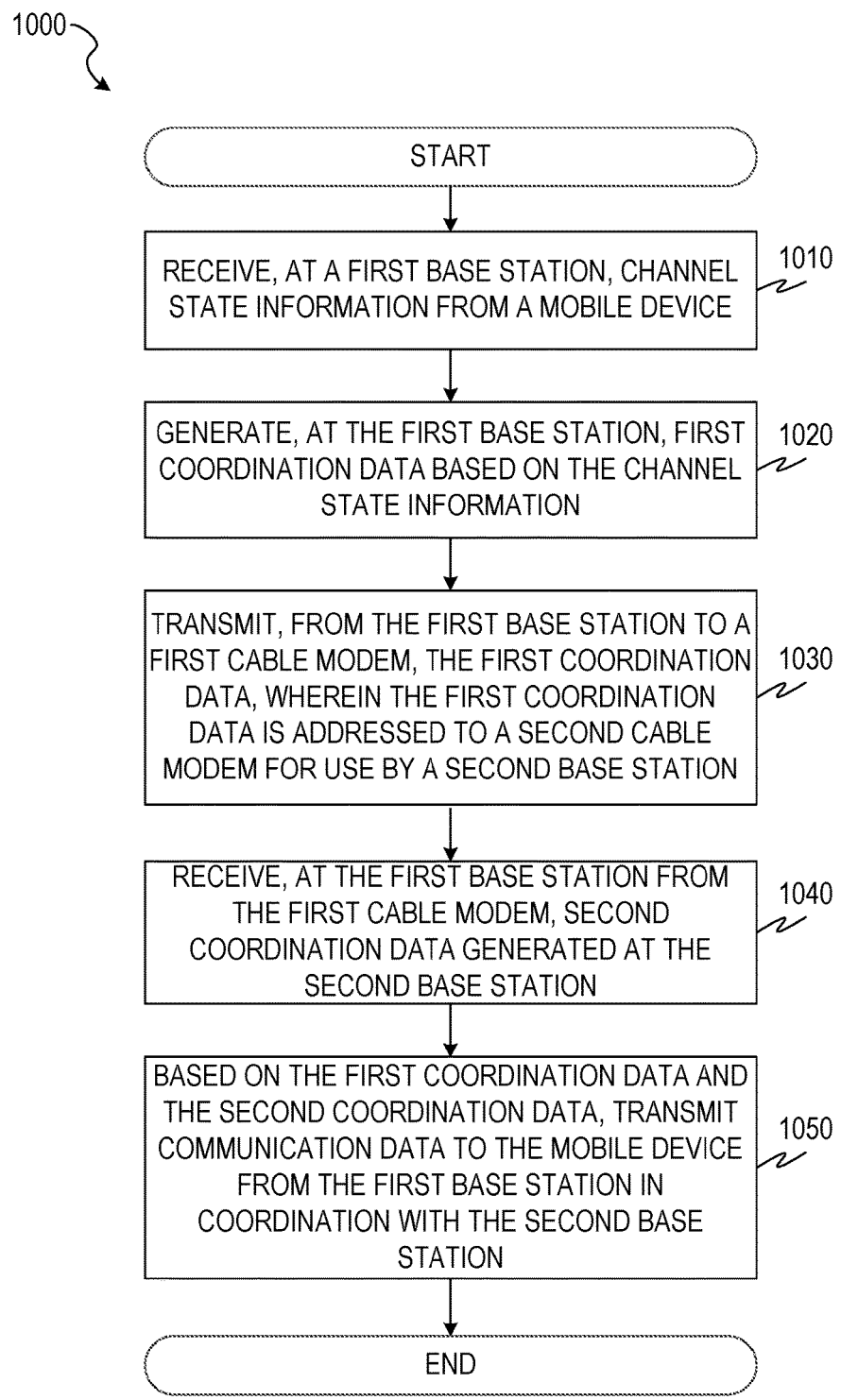
FIG. 10 is a flowchart illustrating operations of a base station in communicating via a cellular network and a cable network, according to some example embodiments.

FIG. 10 is a flowchart illustrating operations of a base station in a process 1000 of communicating via a cellular network and a cable network, according to some example embodiments. The process 1000 includes the operations 1010, 1020, 1030, 1040, and 1050. For purposes of illustration and not limitation, the operations 1010-1050 are described as being performed by the base station 140A and its components, as shown in FIGS. 1-8.

In operation 1010, a first base station (e.g., the base station 140A) receives channel state information (CSI) from a mobile device (e.g., the mobile device 150B). CSI describes how a signal propagates from a base station to a mobile device. The CSI received by the first base station in operation 1010 provides information regarding the connection between the first base station and the mobile device. The CSI may be short-term, long-term, or any suitable combination thereof. Short-term CSI provides information regarding current channel conditions. Long-term CSI provides statistical information regarding past channel conditions, such as a fading distribution, an average channel gain, and spatial correlation.

In operation 1020, the first base station generates first coordination data based on the CSI. The first coordination data be a portion of the CSI, the entirety of the CSI, or data derived at least partially from the CSI. For example, CSI generated at the first base station may be combined with the CSI received from the mobile device to generate the coordination data.

In operation 1030, the first base station transmits the first coordination data to a first cable modem (e.g., the cable modem 130A), wherein the first coordination data is addressed to a second cable modem (e.g., the cable modem 130C) for use by a second base station (e.g., the base station 140C). The first cable modem may transmit the received coordination data to the second cable modem using the method 900, described above.

In operation 1040, the first base station receives, from the first cable modem, second coordination data generated at the second base station. For example, the second cable modem may have transmitted the second coordination to the first cable modem using the method 900, described above.

In operation 1050, based on the first coordination data and the second coordination data, the first base station transmits communication data to the mobile device in coordination with the second base station. For example, based on the signal propagation time from each base station to the mobile device, the two base stations may time their transmissions so that the two transmissions arrive simultaneously at the mobile device. As another example, based on a difference in signal strength, one base station may refrain from transmitting data to the mobile device, allowing only the base station having a stronger signal to transmit without risk of interference.

Although the method 1000 is described as being used to coordinate two base stations, the method 1000 may be used to coordinate additional base stations. For example, operations 1030 and 1040 may be performed repeatedly, once for each other base station being coordinated with. As another example, the data transmitted to the first cable modem in operation 1030 may be transmitted repeatedly by the first cable modem in response to a single transmission by the first base station. As yet another example, the data transmitted in operation 1030 to the first cable modem may be multicast to all base stations being coordinated with. The base stations being coordinated with may be predetermined (e.g., all base stations in adjacent cells), selected based on the CSI (e.g., selecting only base stations that the mobile device is in range of), or any suitable combination thereof (e.g., selecting only base stations in adjacent cells that the mobile device is in range of).

Figure 11:
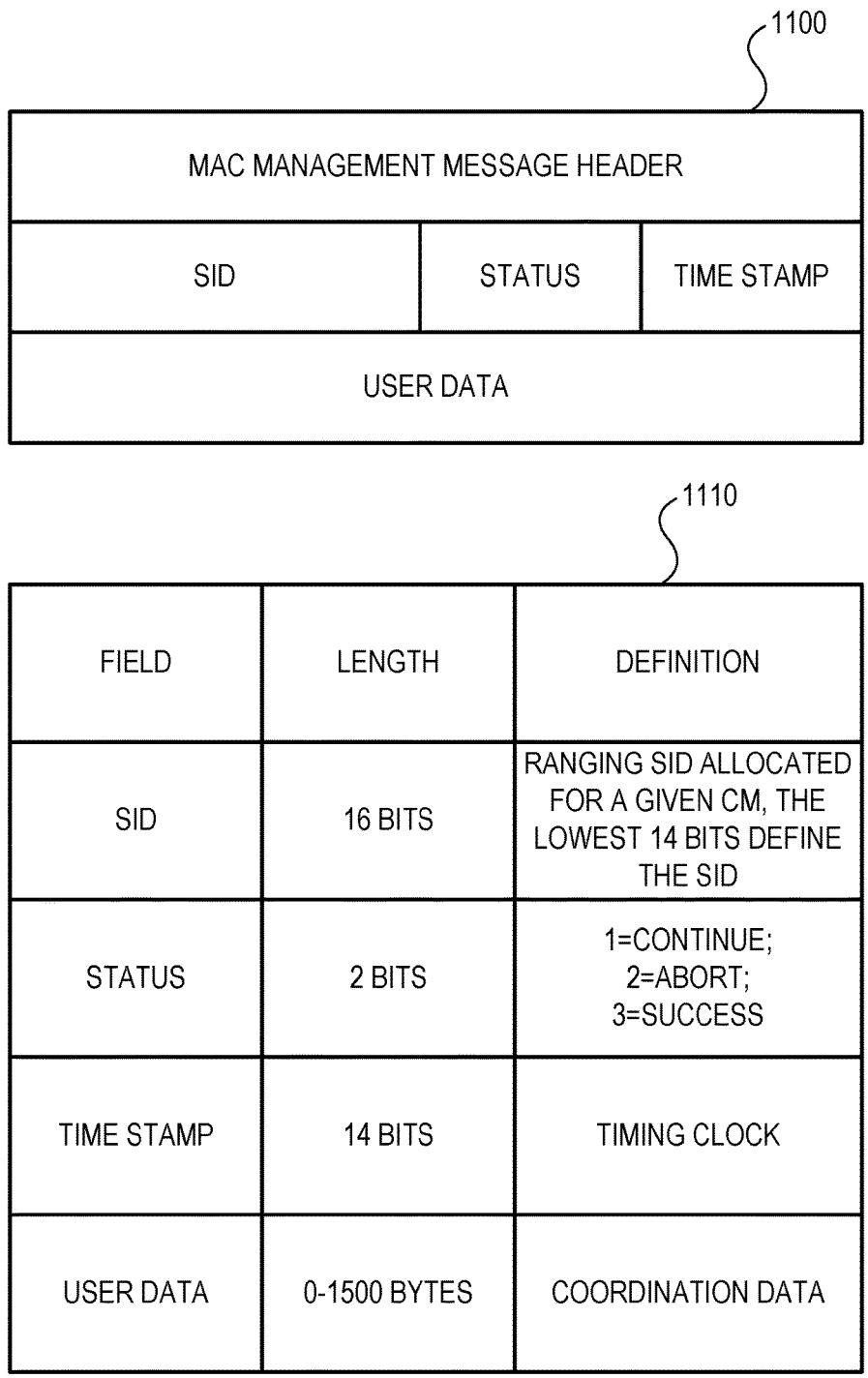
FIG. 11 is a block diagram illustrating data structures for use by a cable modem or a CMTS in communicating via a cable network, according to some example embodiments.

FIG. 11 is a block diagram illustrating data structures for use by a cable modem or a CMTS is communicating via a cable network, according to some example embodiments. The data structure 1100 indicates, in some example embodiments, data exchanged by cable modems in assisting base stations in operating as a coordinated array. The data structure 1100 includes a media access control (MAC) management message header, a service identifier (SID), a status, and a time stamp. The table 1110 shows that the SID is a 16-bit value identifying a particular cable modem. The table 1110 also shows that the status is a 3-bit value indicating whether to continue operating as a coordinated array, to abort, or whether the operation has completed and was successful. The time stamp field is 14 bits long and stores a timing clock value. The data used to coordinate the multiple base stations so that they can operate as an array may be passed in the user data portion of the packet.

The user data (e.g., coordination data) stored in the data structure 900 is addressed to a particular cable modem if the SID of the data structure 900 identifies the particular cable modem. In some example embodiments, a SID that identifies a plurality of cable modems may be used. For example, multiple SID fields may be present, an identifier prefix may be used that addresses all cable modems having identifiers that match the prefix, or any suitable combination thereof.

Although a few embodiments have been described in detail above, other modifications are possible. For example, the logic flows depicted in the figures do not require the particular order shown, or sequential order, to achieve desirable results. Other steps may be provided, or steps may be eliminated, from the described flows, and other components may be added to, or removed from, the described systems. Other embodiments may be within the scope of the following claims.

What is claimed is:

1. A cable modem, comprising:
   a base station interface;
   a cable network interface that connects the cable modem to a cable modem termination system and one or more other cable modems, the cable network interface communicating using orthogonal frequency-division multiple access (OFDMA);
   a memory storage comprising instructions; and
   one or more processors in communication with the cable network interface, the base station interface, and the memory storage, wherein the one or more processors execute the instructions to:
   receive, via the base station interface, coordination data addressed to a first cable modem of the one or more other cable modems, the coordination data allowing a first base station associated with the first cable modem and a second base station in communication with the base station interface to operate as a base station array for a mobile device;
   receive, from the cable modem termination system via the cable network interface, an allocation of a resource block in an OFDMA symbol; and
   transmit, to the first cable modem via the cable network interface, in the allocated resource block in the OFDMA symbol, the coordination data.

2. The cable modem of claim 1, wherein the one or more processors further execute the instructions to:
   after receiving the coordination data via the base station interface, request, from the cable modem termination system via the cable network interface, the allocation of the resource block in the OFDMA symbol.

3. The cable modem of claim 1, wherein:
   the coordination data is addressed to a plurality of cable modems of the one or more other
   the transmitting of the coordination data comprises transmitting the coordination data to the plurality of cable modems.

4. The cable modem of claim 1, wherein the one or more processors further execute the instructions to:
   receive data traffic from the cable modem termination system via the cable network interface, the data traffic being received prior to the transmitting of the coordination data, the data traffic being addressed to the mobile device.

5. The cable modem of claim 1, wherein the base station interface is an interface to a 5G base station.

6. The cable modem of claim 1, wherein the one or more processors further execute the instructions to:
   receive, from the first cable modem via the cable network interface, second coordination data for a first base station corresponding to the first cable modem; and
   transmit, via the base station interface, the second coordination data.

7. The cable modem of claim 1, wherein the mobile device is a smartphone.

8. The cable modem of claim 1, wherein the mobile device is a tablet.

9. The cable modem of claim 1, wherein the mobile device is a smartwatch.

10. A computer-implemented method for transmitting data from a cable modem to one or more other cable modems, comprising:
    receiving, by one or more processors of the cable modem via a base station interface of the cable modem, coordination data addressed to a first cable modem of the one or more other cable modems, the coordination data allowing a first base station associated with the first cable modem and a second base station in communication with the base station interface to operate as a base station array for a mobile device;
    receiving, by the one or more processors, from a cable modem termination system via a cable network interface of the cable modem using orthogonal frequency-division multiple access (OFDMA), an allocation of a resource block in an OFDMA symbol; and
    transmitting to the first cable modem, by the one or more processors, via the cable network interface, in the allocated resource block in the OFDMA symbol, the coordination data.

11. The method of claim 10, further comprising:
    after receiving the coordination data via the base station interface, requesting from the cable modem termination system via the cable network interface, by the one or more processors, the allocation of the resource block in the OFDMA symbol.

12. The method of claim 10, wherein:
the coordination data is addressed to a plurality of cable modems of the one or more other cable modems, including the first cable modem; and
the transmitting of the coordination data comprises transmitting the coordination data to the plurality of cable modems.

13. The method of claim 10, further comprising:
receiving data traffic from the cable modem termination system via the cable network interface, the data traffic being received prior to the transmitting of the coordination data, the data traffic being addressed to the mobile device.

14. The method of claim 10, wherein the receiving of the coordination data via the base station interface comprises receiving the coordination data via an interface to a 5G base station.

15. The method of claim 10, further comprising:
receiving, from the first cable modem via the cable network interface, second coordination data for a first base station corresponding to the first cable modem; and
transmitting, via the base station interface, the second coordination data.

16. A non-transitory computer-readable medium storing computer instructions for transmitting data from a cable modem to one or more other cable modems, that when executed by one or more processors of the cable modem, cause the one or more processors to perform the steps of:
receiving, via a base station interface of the cable modem, coordination data addressed to a first cable modem of the one or more other cable modems, the coordination data allowing a first base station associated with the first cable modem and a second base station in communication with the base station interface to operate as a base station array for a mobile device;
receiving, from a cable modem termination system via a cable network interface of the cable modem using orthogonal frequency-division multiple access (OFDMA), an allocation of a resource block in an OFDMA symbol; and
transmitting, to the first cable modem, via the cable network interface, in the allocated resource block in the OFDMA symbol, the coordination data.

17. The non-transitory computer-readable medium of claim 16, wherein the steps further comprise:
after receiving the coordination data via the base station interface, requesting, from the cable modem termination system and via the cable network interface, the allocation of the resource block in the OFDMA symbol.

18. The non-transitory computer-readable medium of claim 16, wherein:
the coordination data is addressed to a plurality of cable modems of the one or more other cable modems, including the first cable modem; and
the transmitting of the coordination data comprises transmitting the coordination data to the plurality of cable modems.

19. The non-transitory computer-readable medium of claim 16, wherein the steps further comprise:
receiving data traffic from the cable modem termination system via the cable network interface, the data traffic being received prior to the transmitting of the coordination data, the data traffic being addressed to the mobile device.

20. The non-transitory computer-readable medium of claim 16, wherein the receiving of the coordination data via the base station interface comprises receiving the coordination data via an interface to a 5G base station.

* * * * *